United States Patent
Takahashi

(10) Patent No.: US 9,118,169 B2
(45) Date of Patent: Aug. 25, 2015

(54) METHOD FOR MANUFACTURING JUNCTION BOX, JUNCTION BOX, AND CUT SWITCH

(71) Applicant: SUMITOMO WIRING SYSTEMS, LTD., Mie (JP)

(72) Inventor: Yuten Takahashi, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 409 days.

(21) Appl. No.: 13/710,806

(22) Filed: Dec. 11, 2012

(65) Prior Publication Data

US 2013/0229752 A1 Sep. 5, 2013

(30) Foreign Application Priority Data

Mar. 5, 2012 (JP) ................................. 2012-047745

(51) Int. Cl.
*H02B 1/46* (2006.01)
*H02B 1/48* (2006.01)
*H01H 85/20* (2006.01)
*B60L 1/00* (2006.01)

(52) U.S. Cl.
CPC ................ *H02B 1/46* (2013.01); *H01H 85/20* (2013.01); *H02B 1/48* (2013.01); *H01H 2085/208* (2013.01); *Y10T 29/49105* (2015.01)

(58) Field of Classification Search
USPC ......................................... 307/9.1
See application file for complete search history.

(56) References Cited

U.S. PATENT DOCUMENTS 6,280,253 B1 * 8/2001 Kraus et al. .............. 439/620.27
7,830,034 B2 11/2010 Nagasawa et al.

* cited by examiner

*Primary Examiner* — Robert Deberadinis
(74) *Attorney, Agent, or Firm* — Greenblum & Bernstein P.L.C.

(57) ABSTRACT

In a method for manufacturing a junction box, a first cut switch or a second cut switch is selectively provided to a main body. The first cut switch is capable of connecting and breaking a connection between a first power input circuit and a first output circuit, and connecting and breaking a connection between a second power input circuit and a second output circuit. The second cut switch is capable of connecting and breaking a connection between the first power input circuit and the first and second output circuits. The main body includes the first power input circuit; the first output circuit disconnected from the first power input circuit and having at least one of a first electrical device connected thereto; the second power input circuit; and the second output circuit disconnected from the second power input circuit and having at least one of a second electrical device connected thereto.

10 Claims, 2 Drawing Sheets

METHOD FOR MANUFACTURING JUNCTION BOX, JUNCTION BOX, AND CUT SWITCH

CROSS-REFERENCE TO RELATED APPLICATIONS

The present application claims priority under 35 U.S.C. §119 of Japanese Application No. 2012-047745, filed on Mar. 5, 2012, the disclosure of which is expressly incorporated by reference herein in its entirety.

BACKGROUND OF THE INVENTION

1. Field of the Invention

The present invention relates to a technology preventing a battery from dying when an automobile is parked, transported, and the like for an extended period of time.

In order to inhibit a battery from dying when an automobile is parked, transported, and the like for an extended period of time, a cut switch (also called a cut-off switch) has been provided between a power supply and various electrical devices to which power is supplied.

SUMMARY OF THE INVENTION

Applicants have employed a structure in a junction box, such as a fuse block junction box, in which a cut switch is provided on a circuit between a voltage input terminal and connection terminals to various kinds of electrical devices.

In recent years, automobiles employing an idle-stop system have become increasingly common. In the idle-stop system, electrical devices are divided between those to which power is input from a battery and, distinct from these devices, those to which power is supplied from the battery via a DC/DC converter. In the junction box of the automobile employing the idle-stop system of this kind, two power input circuits are provided: one for power input from the battery and one for power input via a converter. In addition, such a junction box provides a cut switch for each circuit.

In addition, depending on the vehicle family, a model employing the idle-stop system and a model not employing the idle-stop system may both be part of a line. In the junction box for the model not employing the idle-stop system, one power input circuit is provided in which power is input from the battery.

However, in a vehicle family that includes a model employing the idle-stop system and a model not employing the idle-stop system, as described above, circuits (boards) provided to the junction box differ when there is one power input circuit compared to when there are two power input circuits.

Thus, the present invention has as an object to make the circuit provided to the junction box uniform regardless of a power input configuration.

A first aspect is a method of manufacturing a junction box installed in an automobile. The method includes selectively providing to a main body one of a first cut switch and a second cut switch. The first cut switch is capable of connecting and breaking a connection between a first power input circuit and a first output circuit as well as connecting and breaking a connection between a second power input circuit and a second output circuit. The second cut switch is capable of connecting and breaking a connection between the first power input circuit and the first and second output circuits. The main body includes the first power input circuit; the first output circuit disconnected from the first power input circuit and having at least one of a first electrical device connected thereto; the second power input circuit; and the second output circuit disconnected from the second power input circuit and having at least one of a second electrical device connected thereto.

A second aspect is a junction box that includes the first power input circuit; the first output circuit disconnected from the first power input circuit and having at least one of the first electrical devices is connected thereto; the second power input circuit; the second output circuit disconnected from the second power input circuit and having at least one of the second electrical devices connected thereto; and a cut switch capable of connecting and breaking a connection between the first power input circuit and the first and second output circuits.

A third aspect is the cut switch, which is provided to a junction box main body that includes the first power input circuit; the first output circuit disconnected from the first power input circuit and having at least one of the first electrical devices connected thereto; the second power input circuit; and the second output circuit disconnected from the second power input circuit and having at least one of the second electrical devices connected thereto. The cut switch includes a connector main body connecting the first power input circuit and the first output circuit, and a connection branch branching from the connector main body and connected to the second output circuit.

According to the method of manufacturing the junction box according to the first aspect, the first cut switch, which is capable of connecting and breaking a connection between the first power input circuit and the first output circuit as well as connecting and breaking a connection between the second power input circuit and the second output circuit, and the second cut switch, which is capable of connecting and breaking a connection between the first power input circuit and the first and second output circuits, are selectively provided. In other words, in a case where power input is provided to each of the first power input circuit and the second power input circuit, the first cut switch is provided to the main body. In a case where power input is provided only to the first power input circuit, the second cut switch is provided to the main body. Therefore, the circuits provided to the junction box can be made uniform regardless of the power input configuration.

According to the junction box according to the second aspect, the junction box includes the first power input circuit; the first output circuit which is disconnected from the first power input circuit and to which at least one of the first electrical devices is connected; the second power input circuit; the second output circuit which is disconnected from the second power input circuit and to which at least one of the second electrical devices is connected; and the cut switch which is capable of connecting and breaking a connection between the first power input circuit and the first and second output circuits. Therefore, in a circuit that includes the two power input circuits (the first power input circuit and the second power input circuit), power can be supplied to the first electrical devices and to the second electrical devices even when power input is provided only to the first power input circuit. Thereby, the circuits provided to the junction box can be made uniform regardless of the power input configuration.

According to the cut switch according to the third aspect, the cut switch includes the connector main body, which connects the first power input circuit and the first output circuit, and the connection branch, which branches from the connector main body and is connected to the second output circuit. Therefore, in a circuit that includes the two power input circuits (the first power input circuit and the second power input circuit), power can be supplied to the first electrical devices and to the second electrical devices even when power input is provided only to the first power input circuit. Thereby, the circuits provided to the junction box can be made uniform regardless of the power input configuration.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Hereafter, a method for manufacturing a junction box, a junction box, and a cut switch are described.

Figure 1:
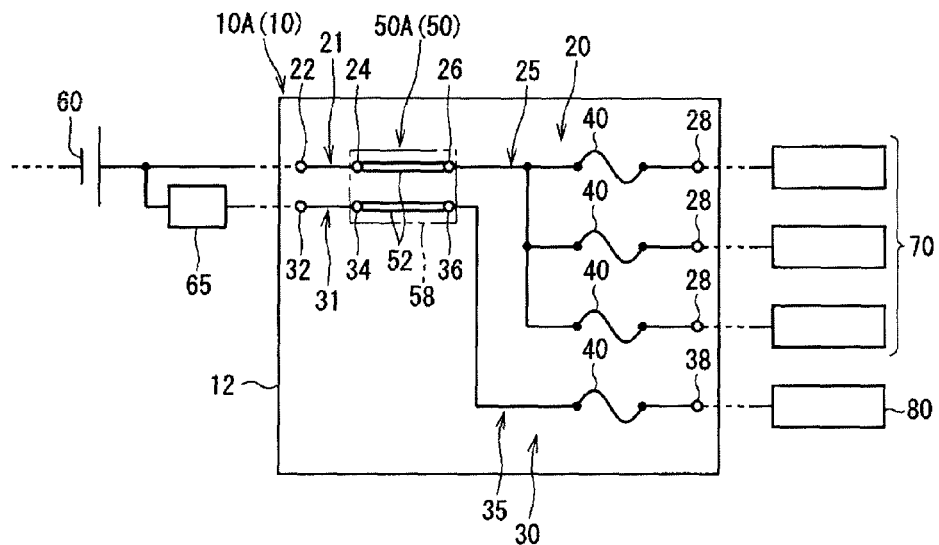
FIG. 1 is a view illustrating a junction box employing a first cut switch.
Figure 2:
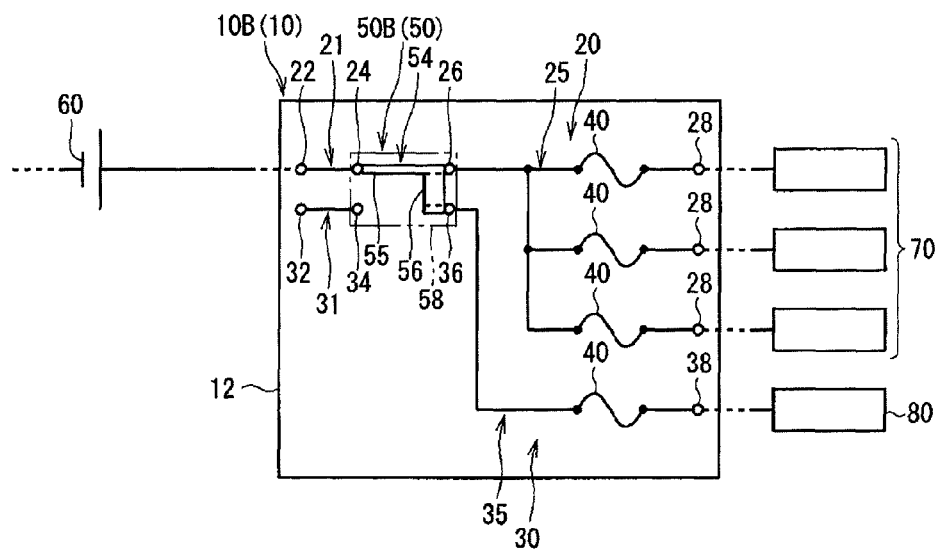
FIG. 2 is a view illustrating a junction box employing a second cut switch.

A junction box 10 is a member for gathering and then, for example, connecting, branching, or relaying electric wires connected to various electrical devices and the like installed in an automobile. The junction box 10 shown in FIGS. 1 and 2 is a fuse block junction box provided in a cabin interior. The junction box 10 is connected to (electric wires connected to) a battery 60 and (electric wires connected to) a plurality of electrical devices 70 and 80. The junction box 10 includes circuits branching from the battery 60 to the plurality of electrical devices 70 and 80 via fuses 40.

In addition, the junction box 10 includes a cut switch 50 on a circuit between the battery 60 and the plurality of electrical devices 70 and 80. Specifically, the cut switch 50 electrically disconnects between the battery 60 and the plurality of electrical devices 70 and 80, thus inhibiting the battery 60 from dying due to a flow of dark current between the battery 60 and the plurality of electrical devices 70 and 80 when the automobile is parked, transported, and the like for an extended period of time.

In addition, the present junction box 10 is appropriately applied to an automobile of a vehicle family which, depending on model, may employ different power input configurations when there is a single power input and when there are two separate power inputs to the plurality of electrical devices 70 and 80. For example, the junction box 10 is appropriately applied to an automobile of a vehicle family in which a model employing an idle-stop system and a model not employing the idle-stop system are part of a line. Specifically, in an idle-stop system, when an engine is restarted, a large amount of electrical current flows to a starter, thereby reducing a voltage applied to the various electrical devices 70 and 80 from the battery 60. Therefore, when electrical devices such as audio and a navigation system (hereafter, second electrical devices 80) are connected to a circuit to which power is input from the battery 60, a phenomenon occurs in which the second electrical devices 80 temporarily stop operating. Thus, in the model employing the idle-stop system, the second electrical devices 80 are connected to the circuit to which power is input from the battery 60 via a DC/DC converter 65, separate from electrical devices (hereafter, first electrical devices 70) connected to the circuit to which power is input from the battery 60. Specifically, power is supplied to the second electrical devices 80 at a voltage in which a reduced input voltage from the battery 60 is boosted by the DC/DC converter 65.

The first electrical devices 70 described above include a cabin light, a meter such as a tachometer, and a check connector. The check connector is a vehicle-side connector for connecting a self-diagnosis box used for failure diagnosis. In addition, the second electrical devices 80 include the audio, the navigation system, headlights, and turn signals. The second electrical devices 80 are devices related to safety while the automobile is stopped, devices related to audio and video, and the like. However, the first electrical devices 70 and the second electrical devices 80 may be swapped depending on the vehicle family.

More specifically, the junction box 10 includes a first circuit 20, a second circuit 30, and the cut switch 50. The first circuit 20 includes a first power input circuit 21 and a first output circuit 25. The second circuit 30 includes a second power input circuit 31 and a second output circuit 35. (See FIGS. 1 and 2.) Also, a main body 12 of the junction box 10 is configured by providing a circuit board including the first power input circuit 21, the first output circuit 25, the second power input circuit 31, and the second output circuit 35 in a resin box formed by injection-molding a synthetic resin material. In addition, the junction box 10 is configured by providing a cut switch to the main body 12.

The first power input circuit 21 is a circuit to which power is input from the battery 60. The first power input circuit 21 includes a first input terminal 22 and a first input switch terminal 24. The first input terminal 22 is a terminal to which an input voltage from the battery 60 is applied. The first input switch terminal 24 is a contact terminal for the cut switch 50.

The first output circuit 25 includes a first output switch terminal 26 and a first output terminal 28. The first output circuit 25 is a circuit disconnected from the first power input circuit 21. The first output circuit 25 conducts to the first power input circuit 21 due to the first input switch terminal 24 and the first output switch terminal 26 being connected. The first output switch terminal 26 is a contact terminal for the cut switch 50. The first output terminal 28 is a terminal connected to the first electrical devices 70. At least one, and herein a plurality (three in FIGS. 1 and 2), of the first output terminal 28 is provided, corresponding to a number of the first electrical devices 70. Also, the first output circuit 25 is formed in a shape branching from the first output switch terminal 26 to the plurality of first output terminals 28. In addition, the fuses 40 are interposed partway down each branch portion of the first output circuit 25.

The second power input circuit 31 is a circuit to which power is supplied from the battery 60 via the DC/DC converter 65. The second power input circuit 31 includes a second input terminal 32 and a second input switch terminal 34. The second input terminal 32 is a terminal to which an input voltage from the battery 60 is applied via the DC/DC converter 65. Herein, the DC/DC converter 65 is a boost (step-up) type DC/DC converter and is configured to be capable of increasing and then outputting an input voltage. The second input switch terminal 34 is a contact terminal for the cut switch 50.

The second output circuit 35 includes a second output switch terminal 36 and a second output terminal 38. The second output circuit 35 is a circuit disconnected from the second power input circuit 31. The second output circuit 35 conducts to the second power input circuit 31 due to the second input switch terminal 34 and the second output switch terminal 36 being connected. The second output circuit 35 conducts to the first power input circuit 21 due to the first input switch terminal 24 and the second output switch terminal 36 being connected. The second output switch terminal 36 is a contact terminal for the cut switch 50. The second output terminal 38 is a terminal connected to the second electrical devices 80. At least one of the second output terminal 38 is provided, corresponding to a number of the second electrical devices 80. FIG. 1 illustrates an example where one second output terminal 38 is provided. However, a plurality of second output terminals 38 may of course be provided to correspond to a plurality of second electrical devices 80. In addition, the fuse 40 is interposed partway down the second output circuit 35.

In the method for manufacturing the present junction box, a first cut switch 50A or a second cut switch 50B is selectively provided to the main body 12 to manufacture the junction box 10. More specifically, the first cut switch 50A is provided to the main body 12 when power input is provided to the first power input circuit 21 and the second power input circuit 31, as in a case where the idle-stop system is employed in the automobile. The second cut switch 50B is provided to the main body 12 when power input is provided only to the first power input circuit 21, as in a case where the idle-stop system is not employed.

Hereafter, the junction box 10 that is installed in an automobile employing the idle-stop system is described as a junction box 10A and the junction box 10 that is installed in an automobile not employing the idle-stop system is described as a junction box 10B. Moreover, when referring to both, the junction box 10 (cut switch 50) will be used as has been done up to this point.

Herein, a difference is described between devices connected to the main body 12 when employing and when not employing the idle-stop system in the automobile. When the idle-stop system is employed in the automobile, power is input from the battery 60 to the first power input circuit 21 and power is also input from the battery 60 to the second power input circuit 31 via the DC/DC connector 65. Meanwhile, when the idle-stop system is not employed in the automobile, power is input from the battery 60 to the first power input circuit 21. In such a case, power is not input to the second power input circuit 31.

First, the first junction box 10A is described (see FIG. 1). The first cut switch 50A is formed so as to be capable of connecting and breaking a connection between the first input switch terminal 24 and the first output switch terminal 26, and also so as to be capable of connecting and breaking a connection between the second input switch terminal 34 and the second output switch terminal 36. Specifically, by providing the first cut switch 50A to the main body 12, the first power input circuit 21 and the first output circuit 25 are conducted, and also the second power input circuit 31 and the second output circuit 35 are conducted. Thereby, power is supplied from the battery 60 to the plurality of first electrical devices 70, and power is also supplied from the battery 60 to the second electrical devices 80 via the DC/DC converter 65.

Figure 3:
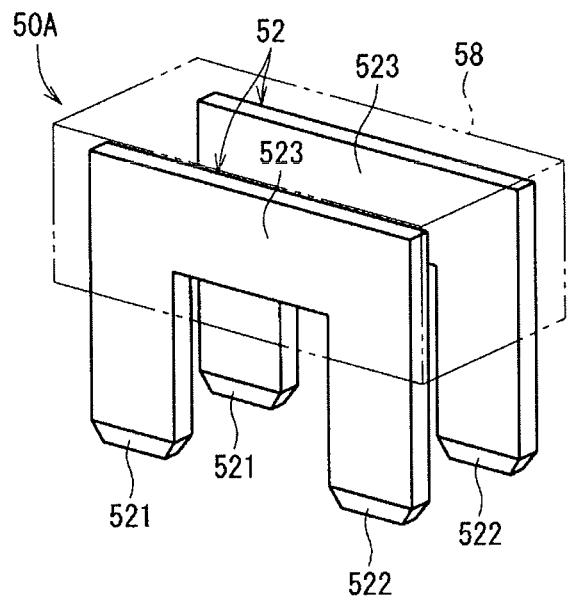
FIG. 3 is a view illustrating the first cut switch.

More specifically, the first cut switch 50A includes a pair of first connectors 52 and a support 58 supporting the pair of first connectors 52 (see FIG. 3).

The pair of first connectors 52 are portions each formed by a conductor and connecting each of the switch terminals to the other. More specifically, the pair of first connectors 52 is formed so as to be capable of connecting the first input switch terminal 24 with the first output switch terminal 26 or the second input switch terminal 34 with the second output switch terminal 36.

The first connectors 52 include an input contact 521, an output contact 522, and a link 523. The first connectors 52 are formed overall in a shape flattened along a single plane. The first connectors 52 may be formed by punching out from a metal plate.

The input contact 521 is a portion contacting the first input switch terminal 24 or the second input switch terminal 34. The input contact 521 is formed in a long, narrow plate shape. The output contact 522 is a portion contacting the first output switch terminal 26 or the second output switch terminal 36. The output contact 522 is formed in a long, narrow plate shape similar to the input contact 521 and is provided in a posture substantially parallel to the input contact 521. Moreover, forefront portions of the input contact 521 and the output contact 522 may be formed in a tapered shape (or may be chamfered). The link 523 is formed in a plate shape linking the input contact 521 and the output contact 522 in a configuration where each of the base end portions are joined to each other.

The support 58 supports the pair of first connectors 52 in parallel, separated by a gap. More specifically, the support 58 is formed so as to support each base end portion of the pair of first connectors 52. Configurations in which the support 58 supports the pair of first connectors 52 include a configuration engaging the pair of first connectors 52, which are supported by a screw or pinning; a configuration in which the pair of first connectors 52 are supported by mold casting; and the like. In addition, the support 58 supports the pair of first connectors 52 separated by a gap in which the input contact 521 and the output contact 522 of one of the first contacts 52 contact the first input switch terminal 24 and the first output switch terminal 26, respectively, and in which the input contact 521 and the output contact 522 of another of the first contacts 52 contact the second input switch terminal 34 and the second output switch terminal 36, respectively.

Moreover, on an interior, the main body 12 may include insertion holes to which the first input switch terminal 24, the first output switch terminal 26, the second input switch terminal 34, or the second output switch terminal 36 are provided, for example, the switch terminals having a tongue tab shape (not shown in the drawings). In other words, the cut switch 50A is provided in a configuration where the input contact 521 or the output contact 522 of the first contact 52 is inserted in between an inner wall of each insertion hole and the tongue tab. Thereby, each of the contacts 521 or 522 and each of the switch terminals 24, 26, 34, or 36 respectively make contact and are electrically connected.

Next, the second junction box 10B is described (see FIG. 2). The second cut switch 50B is formed so as to be capable of connecting and breaking a connection between the first input switch terminal 24 and the first and second output switch terminals 26 and 36. In other words, by providing the second cut switch 50B to the main body 12, the first power input circuit 21 and the first and second output circuits 25 and 35 are conducted. Thereby, power is supplied from the battery 60 to the plurality of first electrical devices 70 and the second electrical devices 80.

Figure 4:
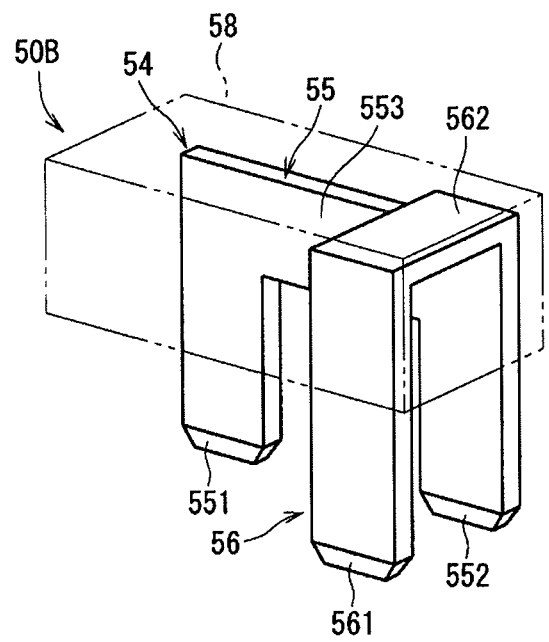
FIG. 4 is a view illustrating the second cut switch.

More specifically, the second cut switch 50B includes a second connector 54 and the support 58 supporting the second connector 54 (see FIG. 4).

The second connector 54 is a portion formed by a conductor and connecting each of the switch terminals to one other. More specifically, the second connector 54 is formed so as to be capable of connecting the first input switch terminal 24 with the first and second output switch terminals 26 and 36. The second connector 54 includes a connector main body 55 and a connection branch 56.

The connector main body 55 is a portion connecting the first power input circuit 21 with the first output circuit 25. The connector main body 55 includes an input contact 551, a first output contact 552, and a main body link 553. The input contact 551 is a portion contacting the first input switch terminal 24. The first output contact 552 is a portion contacting the first output switch terminal 26. The main body link 553 is a portion linking the input contact 551 with the first output contact 552. In addition, the connector main body 55 is formed in the same shape as the first connector 52 in the first cut switch 50A. Specifically, the input contact 551, the first output contact 552, and the main body link 553 are each formed in the same shape as the input contact 521, the output contact 522, and the link 523 of the first connector 52, respectively.

The connection branch 56 is a portion branching from the connector main body 55 and connecting to the second output circuit 35. The connection branch 56 includes a second output contact 561 and a branch link 562. The second output contact 561 is a portion contacting the second output switch terminal 36. The second output contact 561 is formed in the same shape as the input contact 551 and the first output contact 552 and is provided in parallel to the first output contact 552. More specifically, the connector main body 55 is formed to be flat along a single plane. The second output contact 561 is provided on a second plane parallel to the connector main body 55, separated by a gap, in a position opposite to the first output contact 552. The branch link 562 is a portion linking the first output contact 552 and the second output contact 561 in a configuration where each of the base end portions are joined to each other. Herein, the branch link 562 is formed to be flat along a plane orthogonal to a length direction of the first and second output contacts 552 and 561. In addition, the branch link 562 links the second output contact 561 to the first output contact 552, separated by a gap in which the first output contact 552 contacts the first output switch terminal 26 and the second output contact 561 contacts the second output switch terminal 36.

The second connector 54 may be formed by punching and bending a metal plate, or the like.

The support 58 is formed so as to support a base end portion of the second connector 54. Herein, the support 58 can support the second connector 54 in a configuration similar to the configuration in which the support 58 in the first cut switch 50A supports the pair of first connectors 52.

In addition, the second cut switch 50B is also provided in a configuration where the input contact 551, the first output contact 552, or the second output contact 561 of the second connector 54 is inserted in between the inner wall of each insertion hole and the tongue tab. Thereby, each of the contacts 551, 552, or 561 and each of the switch terminals 24, 26, or 36 respectively make contact and are electrically connected.

According to the method for manufacturing the junction box according to the above embodiments, the first cut switch 50A or the second cut switch 50B is selectively provided. The first cut switch 50A is capable of connecting and breaking a connection between the first power input circuit 21 and the first output circuit 25, and is also capable of connecting and breaking a connection between the second power input circuit 31 and the second output circuit 35. The second cut switch 50B is capable of connecting and breaking a connection between the first power input circuit 21 and the first and second output circuits 25 and 35. Specifically, the first cut switch 50A is provided to the main body 12 when power input is provided to each of the first power input circuit 21 and the second power input circuit 31. The second cut switch 50B is provided to the main body 12 when power input is provided only to the first power input circuit 21. Therefore, circuits provided to the junction box 10 can be made uniform regardless of the power input configuration. Accordingly, work-hours for design and equipment for manufacturing the resin box and circuit (board) of the junction box 10 can be halved, as well as contributing to a reduction in costs due to an increase in number of manufactured pieces.

In addition, the junction box 10B includes the first power input circuit 21; the first output circuit 25, which is disconnected from the first power input circuit 21 and to which at least one of the first electrical devices 70 is connected; the second power input circuit 31; the second output circuit 35, which is disconnected from the second power input circuit 31 and to which at least one of the second electrical devices 80 is connected; and the second cut switch 50B, which is capable of connecting and breaking a connection between the first power input circuit 21 and the first and second output circuits 25 and 35. Therefore, in a circuit that includes two power input circuits (the first power input circuit 21 and the second power input circuit 31), power can be supplied to the first electrical devices 70 and to the second electrical devices 80 even when power input is provided only to the first power input circuit 21. Thereby, the circuits provided to the junction box 10 can be made uniform regardless of the power input configuration.

In addition, the second cut switch 50B includes the connector main body 55 and the connection branch 56. The connector main body 55 connects the first power input circuit 21 and the first output circuit 25. The connection branch 56 branches from the connector main body 55 and is connected to the second output circuit 35. Therefore, in a circuit that includes two power input circuits (the first power input circuit 21 and the second power input circuit 31), power can be supplied to the first electrical devices 70 and the second electrical devices 80 even when power input is provided only to the first power input circuit 21. Thereby, the circuits provided to the junction box 10 can be made uniform regardless of the power input configuration.

Up to this point, an explanation has been given of the cut switches 50A and 50B with examples having shapes in which long, narrow plate-shaped input contacts and output contacts have been linked by a link at the base end portions thereof. However, the present invention is not limited to this. Specifically, the cut switches 50A and 50B may be capable of connecting and breaking a connection between an input switch terminal and an output switch terminal, and can employ a variety of shapes. In addition, the cut switches 50A and 50B are not limited to a shape capable of being inserted and withdrawn through the insertion holes formed on the main body 12.

An explanation has been given with an example in which the input contact 521 and the output contact 522 of the first connector 52 in the first cut switch 50A have the same shape. However, these may be formed in different shapes to correspond to the shape of the main body 12. In addition, an explanation has been given with an example in which the pair of first connectors 52 are formed in the same shape. However, the pair of first connectors 52 may be formed in different shapes to correspond to the shape of the main body 12.

In addition, an explanation has been given with an example in which the input contact 551, the first output contact 552, and the second output contact 561 of the second connector 54 in the second cut switch 50B are formed in the same shape. However, these may be formed in different shapes to correspond to the shape of the main body 12.

In addition, the first cut switch 50A may be configured with two members in which the pair of first connectors 52 are each supported by a separate support, the two members being formed so as to be capable of mutually independently connecting the first input switch terminal 24 and the first output switch terminal 26 or the second input switch terminal 34 and the second output switch terminal 36.

In addition, the connection branch 56 of the second cut switch 50B should be capable of connecting the connector main body 55 and the second output switch terminal 36, and is not limited to the above-described shape. For example, the second cut switch 50B may also have a shape having a portion contacting the second input switch terminal 34.

In addition, an explanation has been given targeting application to the automobile of the vehicle family in which the model employing the idle-stop system and the model not employing the idle-stop system are part of the line. However, the present method for manufacturing the junction box, the junction boxes 10A and 10B, and the cut switches 50A and 50B may be appropriately applied to an automobile of a vehicle family in which a model having two power input systems and a model having one power input system are part of the line.

The method for manufacturing the junction box, the junction box 10, and the cut switch 50B were described in detail above. However, the above description is in all respects illustrative and the present invention is not limited thereto. In addition, the various modifications mentioned above may be appropriately applied in combination inasmuch as they are not mutually exclusive. In addition, innumerable modifications not recited as examples are understood to be conceivable without departing from the scope of the present invention.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A method of manufacturing a junction box installed in an automobile, comprising:
    selectively providing to a main body, one of a first cut switch and a second cut switch, the first cut switch being configured for connecting and breaking, in the absence of a current flow to the first cut switch, a connection between a first power input circuit and a first output circuit as well as connecting and breaking, in the absence of a current flow to the second cut switch, a connection between a second power input circuit and a second output circuit, the second cut switch being configured for connecting and breaking, in the absence of a current flow to the second cut switch, a connection between the first power input circuit and the first and second output circuits, wherein
    the main body comprises
        the first power input circuit;
        the first output circuit disconnected from the first power input circuit by the first cut switch and having at least one of a first electrical device connected thereto;
        the second power input circuit; and
        the second output circuit disconnected from the second power input circuit by the second cut switch and having at least one of a second electrical device connected thereto.

2. The method of manufacturing a junction box according to claim 1, wherein each of the first and second output circuits includes a fuse.

3. The method of manufacturing a junction box according to claim 1, wherein the first cut switch includes a pair of conductors for the first power input circuit and the first output circuit and a pair of conductors for the second power input circuit and the second output circuit, and the second cut switch includes conductors for each of the first input power circuit, the first output circuit and the second output circuit.

4. The method of manufacturing a junction box according to claim 1, wherein, when the first cut switch is selectively provided, the first power input circuit is connected to a power source and the second power input circuit is connected to the power source through a converter.

5. A junction box, comprising:
    a first power input circuit;
    a first output circuit disconnected from the first power input circuit and having at least one of a first electrical device connected thereto;
    a second power input circuit;
    a second output circuit disconnected from the second power input circuit and having at least one of a second electrical device connected thereto; and
    a cut switch configured, in the absence of a current flow to the cut switch, for connecting and breaking a connection between the first power input circuit and the first and second output circuits.

6. The junction box according to claim 5, wherein each of the first and second output circuits includes a fuse.

7. The junction box according to claim 5, wherein the junction box is configured to selectively receive a further cut switch which is configured, in the absence of a current flow to the further cut switch, to make and break a connection between the first power input circuit and the first output circuit and between the second power input circuit and the second output circuit.

8. A cut switch provided to a junction box main body, the junction box main body comprising:
    a first power input circuit;
    a first output circuit disconnected from the first power input circuit and having at least one of a first electrical device connected thereto;
    a second power input circuit; and
    a second output circuit disconnected from the second power input circuit and having at least one of a second electrical device connected thereto, the cut switch being configured to connect and to break a connection between at least the first power input circuit and the first output circuit in the absence of a current flow to the cut switch and comprising:
a connector main body connecting the first power input circuit and the first output circuit; and
a connection branch branching from the connector main body and connected to the second output circuit.

9. The cut switch according to claim 8, wherein each of the first and second output circuits includes a fuse.

10. The cut switch according to claim 8, wherein the cut switch is provided to the junction box main body and provides power from only the first power input circuit to each of the first output circuit and the second output circuit.

* * * * *